8 Sheets—Sheet 1.

P. P. COLER.

GRAIN BINDER.

No. 11,103. Reissued Aug. 19, 1890.

Witnesses
Geo. W. Young.
Henry A. Lamb.

Inventor
Peter P. Coler.
By his Attorneys
Parkinson & Parkinson

THE NORRIS PETERS CO., PHOTO-LITHO., WASHINGTON, D. C.

8 Sheets—Sheet 2.

P. P. COLER.

GRAIN BINDER.

No. 11,103. Reissued Aug. 19, 1890.

Witnesses
Geo. W. Young.
Henry A. Lamb

Inventor
Peter P. Coler.
By his Attorneys
Parkinson & Parkinson

THE NORRIS PETERS CO., PHOTO-LITHO., WASHINGTON, D. C.

8 Sheets—Sheet 3.

P. P. COLER.

GRAIN BINDER.

No. 11,103. Reissued Aug. 19, 1890.

Witnesses

Geo W Young

Henry A. Lamb.

Inventor

Peter P. Coler.

By his Attorneys

Parkinson & Parkinson

THE NORRIS PETERS CO., PHOTO-LITHO., WASHINGTON, D. C.

8 Sheets—Sheet 4.

P. P. COLER.

GRAIN BINDER.

No. 11,103. Reissued Aug. 19, 1890.

Witnesses
Geo W Young
Henry A. Lamb.

Inventor
Peter P. Coler.

By his Attorneys
Parkinson & Parkinson

THE NORRIS PETERS CO., PHOTO-LITHO., WASHINGTON, D. C.

P. P. COLER.

GRAIN BINDER.

No. 11,103. Reissued Aug. 19, 1890.

Witnesses
Geo. W. Young.
Henry A. Lamb.

Inventor
Peter P. Coler.
By his Attorneys
Parkinson & Parkinson

THE NORRIS PETERS CO., PHOTO-LITHO., WASHINGTON, D. C.

P. P. COLER.

GRAIN BINDER.

No. 11,103. Reissued Aug. 19, 1890.

Witnesses.
Geo W. Young.
Henry A. Lamb.

Inventor
Peter P. Coler.
By his Attorneys
Parkinson & Parkinson

THE NORRIS PETERS CO., PHOTO-LITHO., WASHINGTON, D. C.

P. P. COLER.
GRAIN BINDER.
No. 11,103. Reissued Aug. 19, 1890.
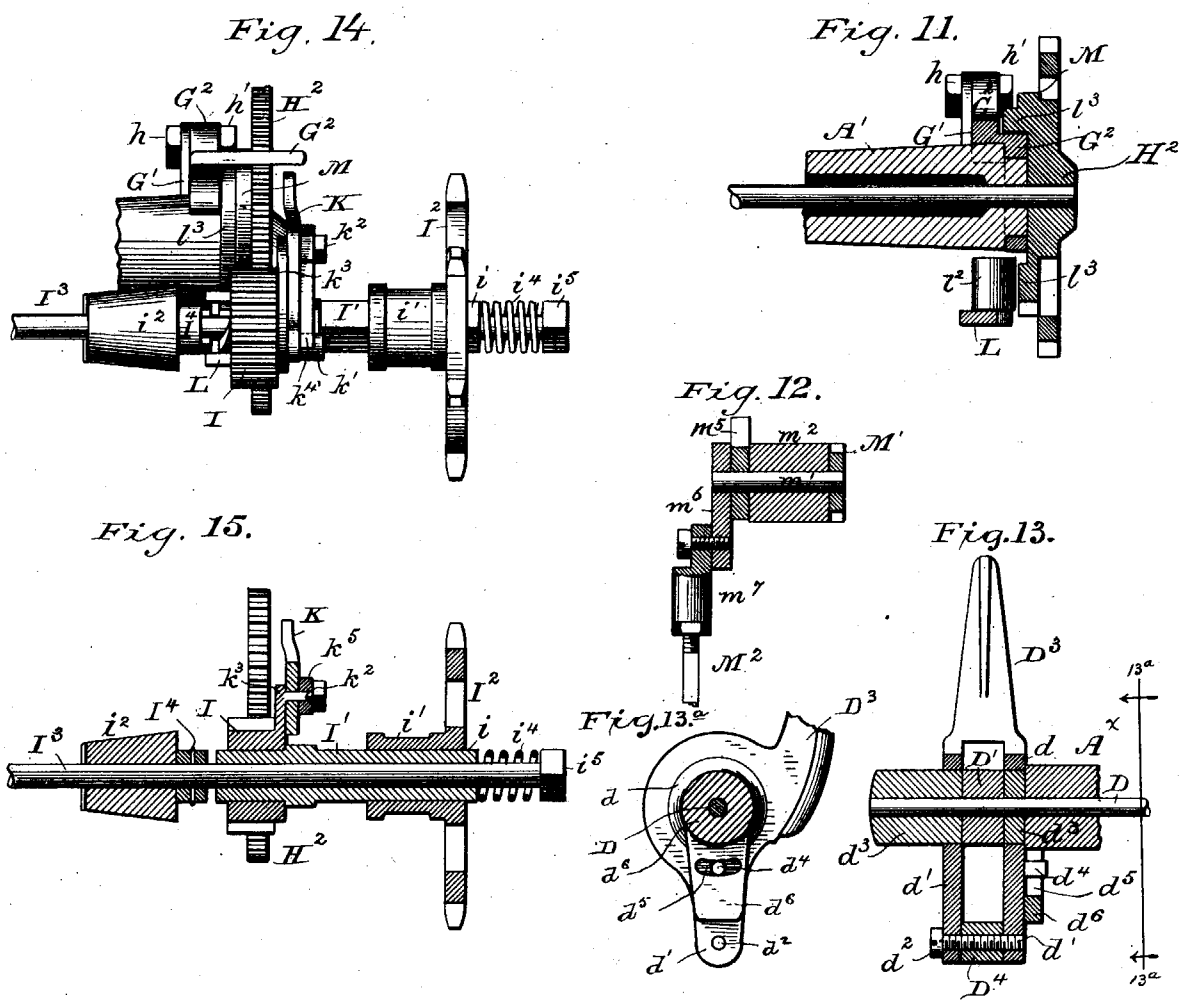
Witnesses
Geo W Young
Henry A. Lamb.
Inventor
Peter P. Coler.
By his Attorneys
Pennie Davis & Marvin
THE NORRIS PETERS CO., PHOTO-LITHO., WASHINGTON, D. C.

P. P. COLER.
GRAIN BINDER.
No. 11,103. Reissued Aug. 19, 1890.
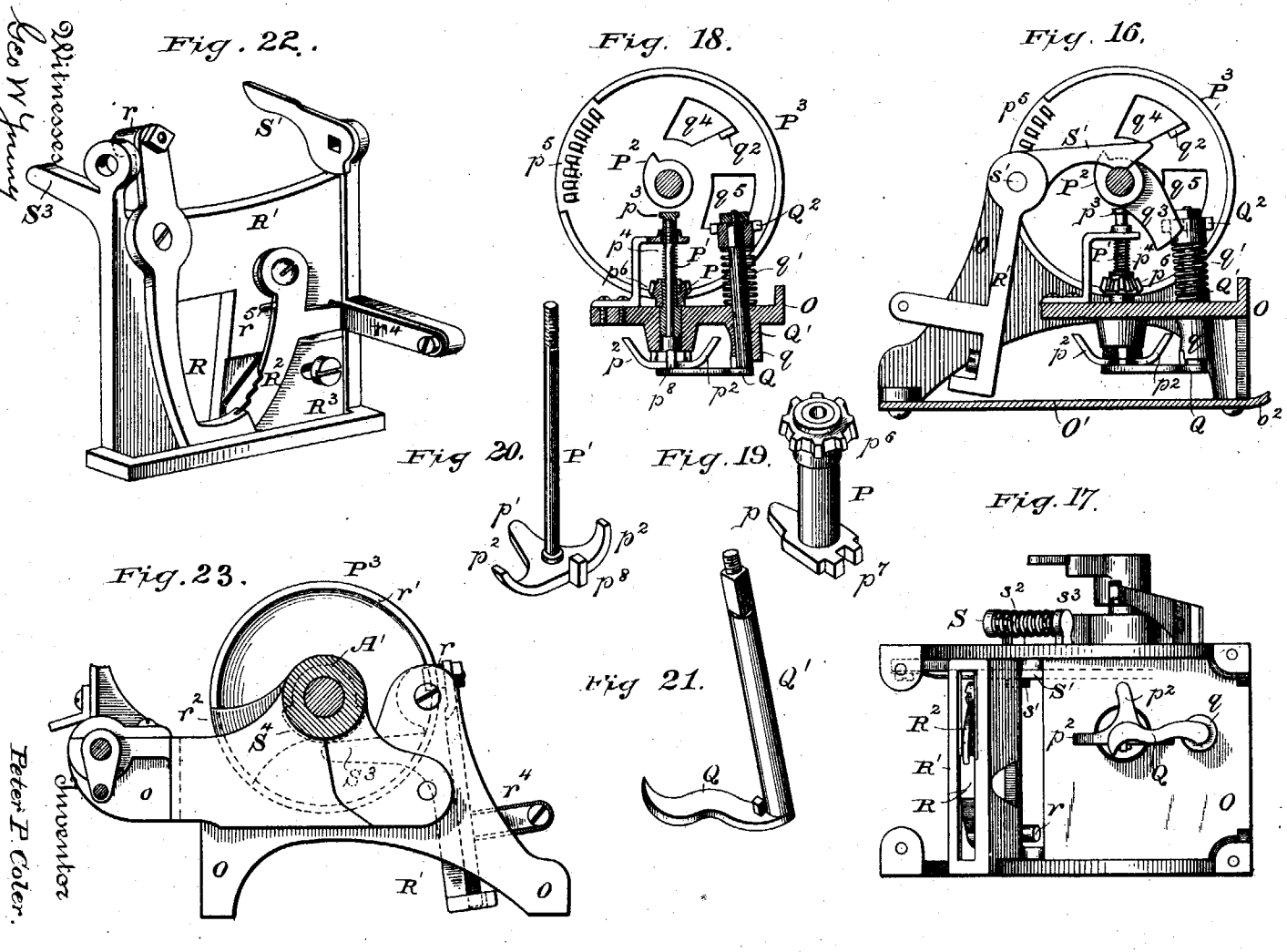
Witnesses
Geo W Young
Henry A. Lamb.
Inventor
Peter P. Coler.
By his Attorneys
Parmiss & Parmiss
THE NORRIS PETERS CO., PHOTO-LITHO., WASHINGTON, D. C.

UNITED STATES PATENT OFFICE.

PETER PAUL COLER, OF CLYMAN, WISCONSIN.

GRAIN-BINDER.

SPECIFICATION forming part of Reissued Letters Patent No. 11,103, dated August 19, 1890.

Original No. 336,895, dated March 2, 1886. Application for reissue filed March 25, 1887. Serial No. 232,424.

*To all whom it may concern:*

Be it known that I, PETER PAUL COLER, a citizen of the United States of America, residing at Clyman, in the county of Dodge and State of Wisconsin, have invented certain new and useful Improvements in Automatic Grain-Binders, of which the following is a specification.

My invention relates, so far as this present division of my reissue is concerned, to special improvements in the tripping, tying, and holding mechanisms of a binder, and in the general organization of the machine, all substantially as hereinafter fully set forth and pointed out in the claims.

Figure 1:
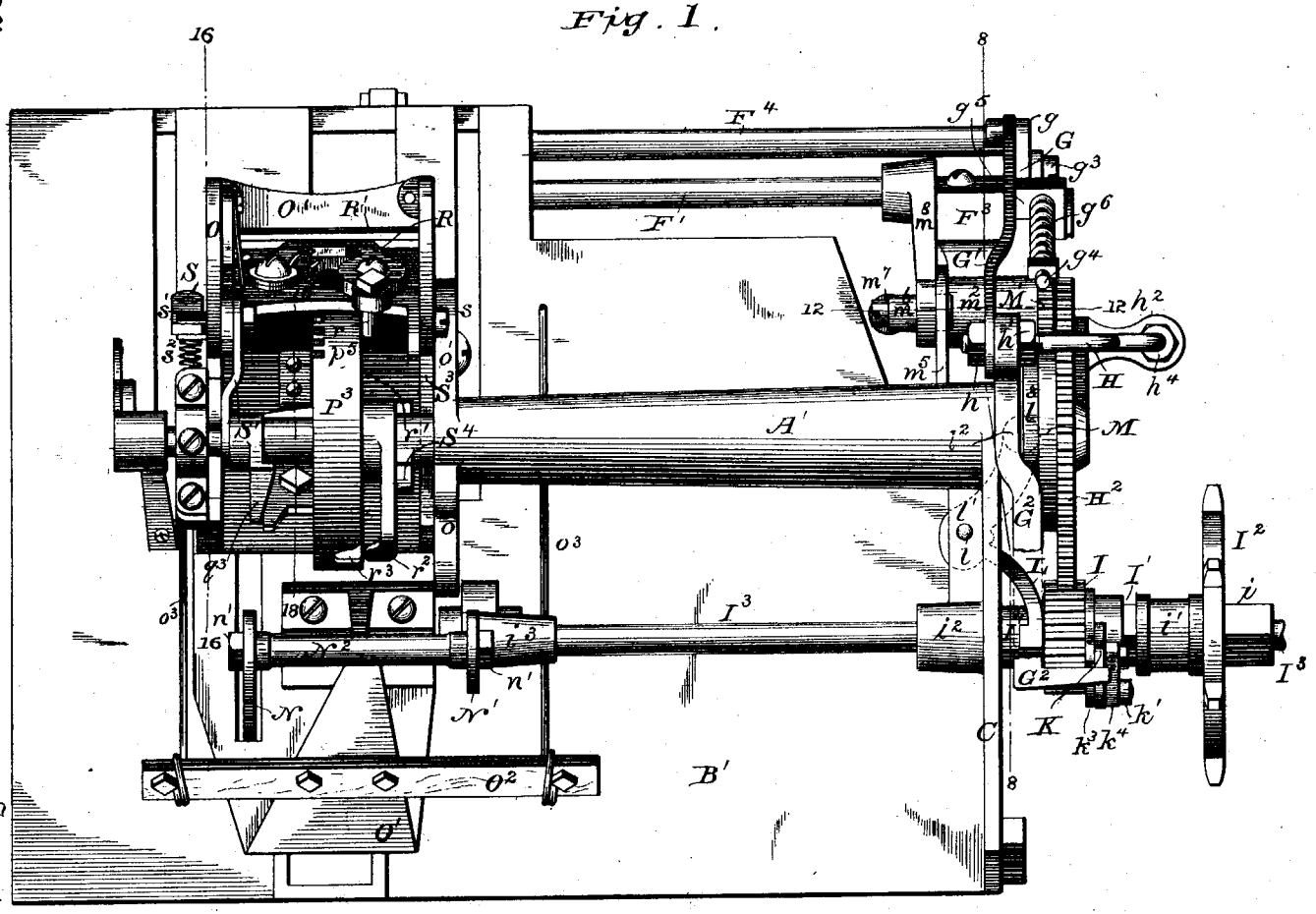
Figure 2:
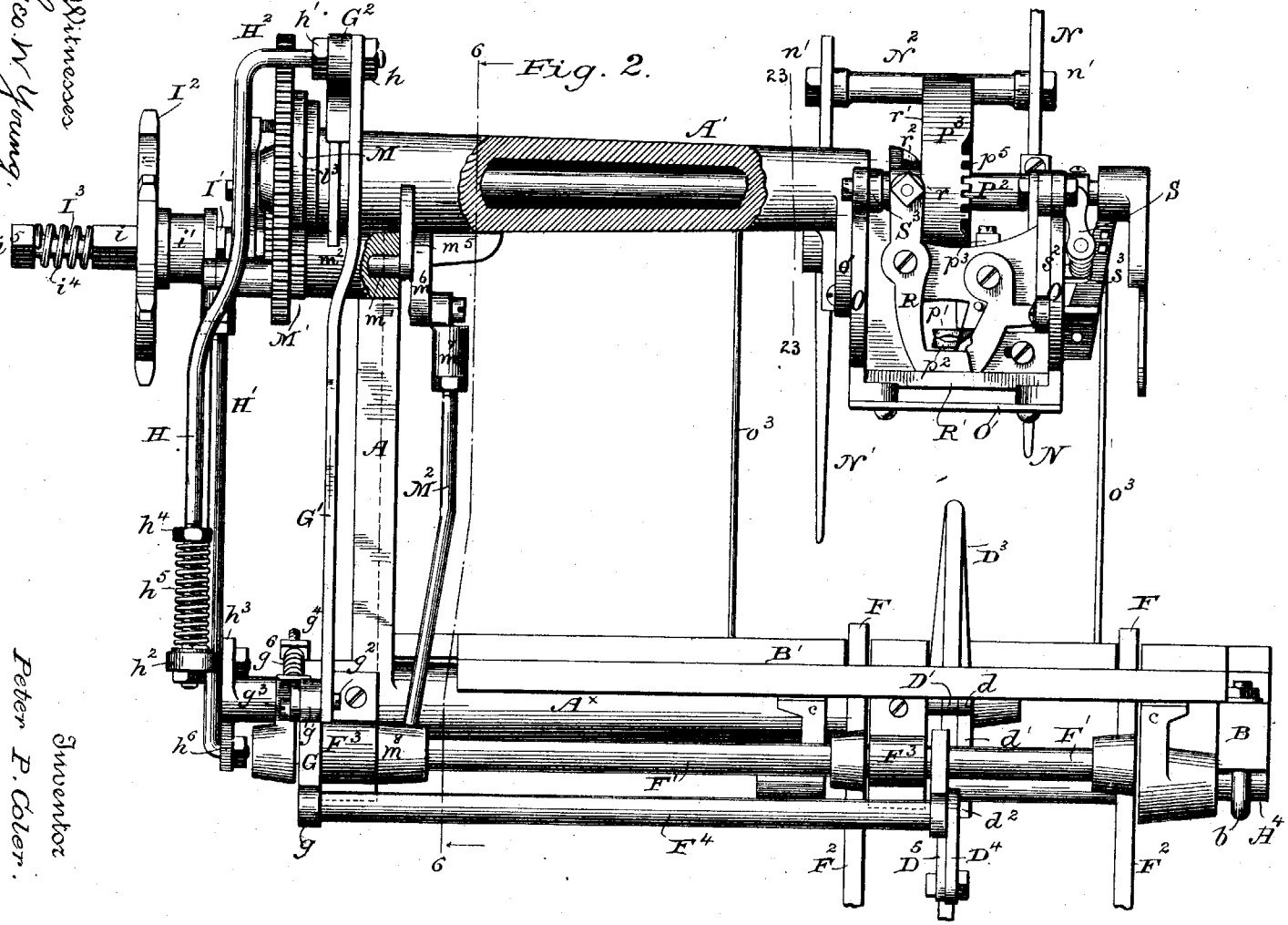
Figure 3:
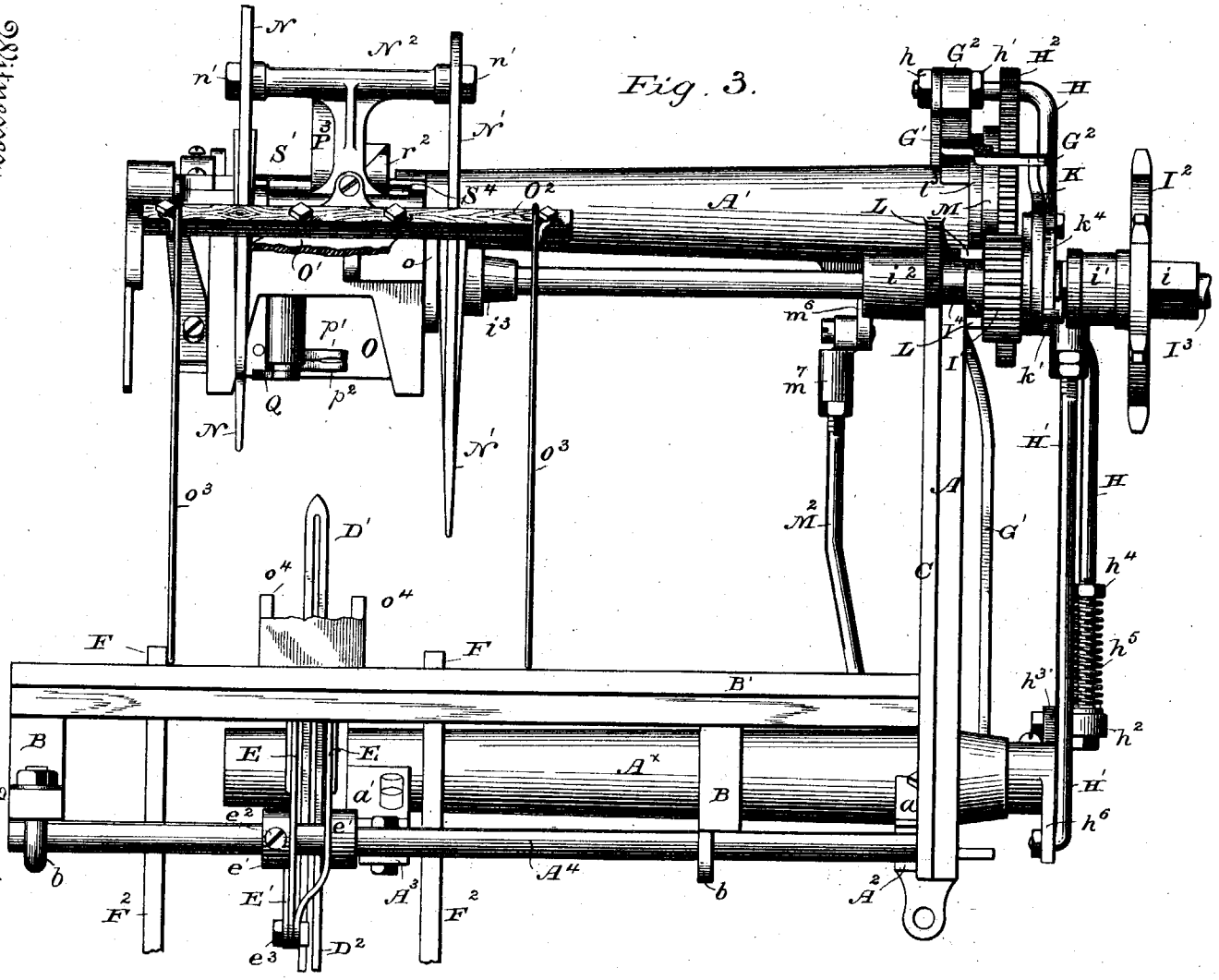
Figure 4:
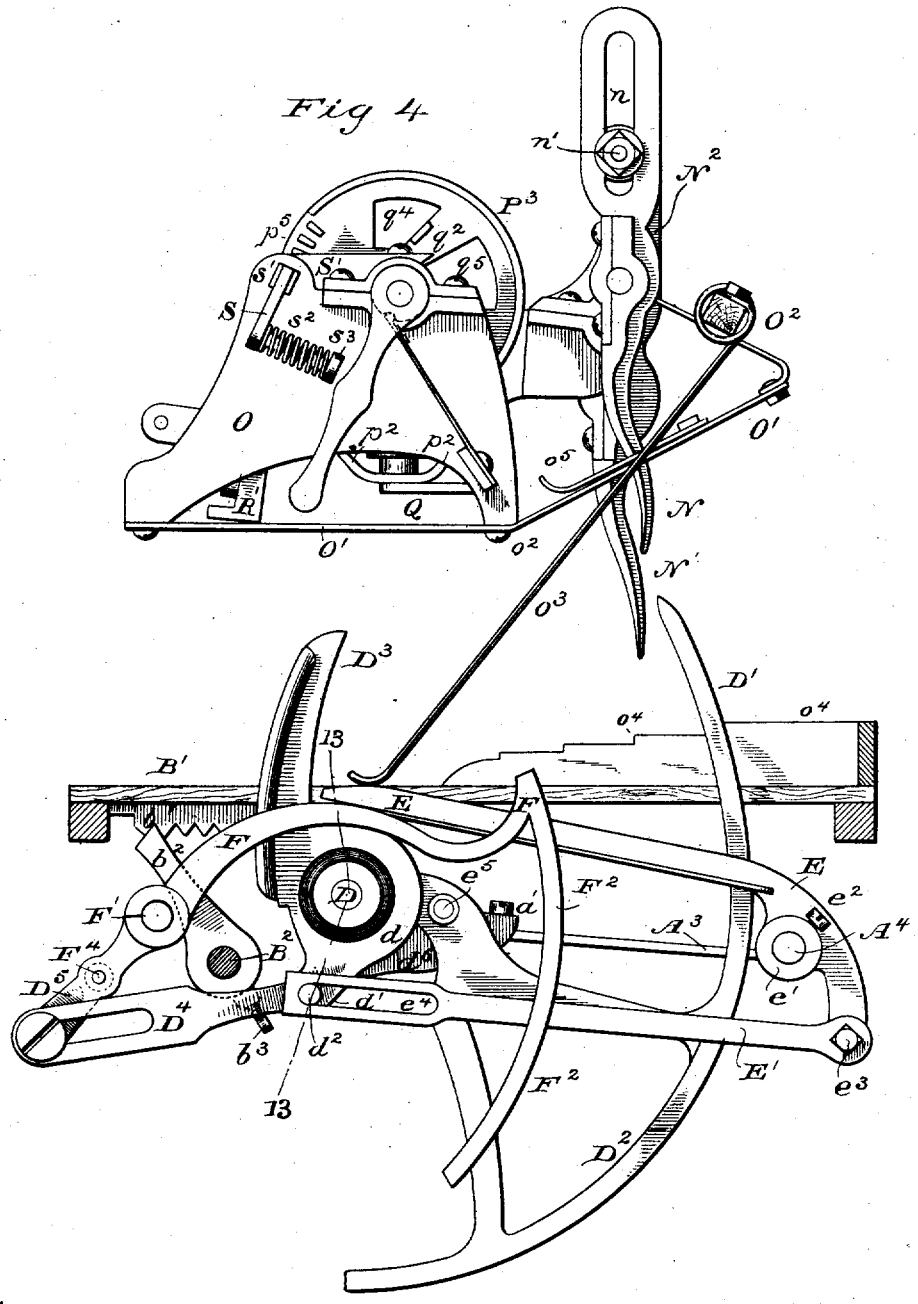
Figure 5:
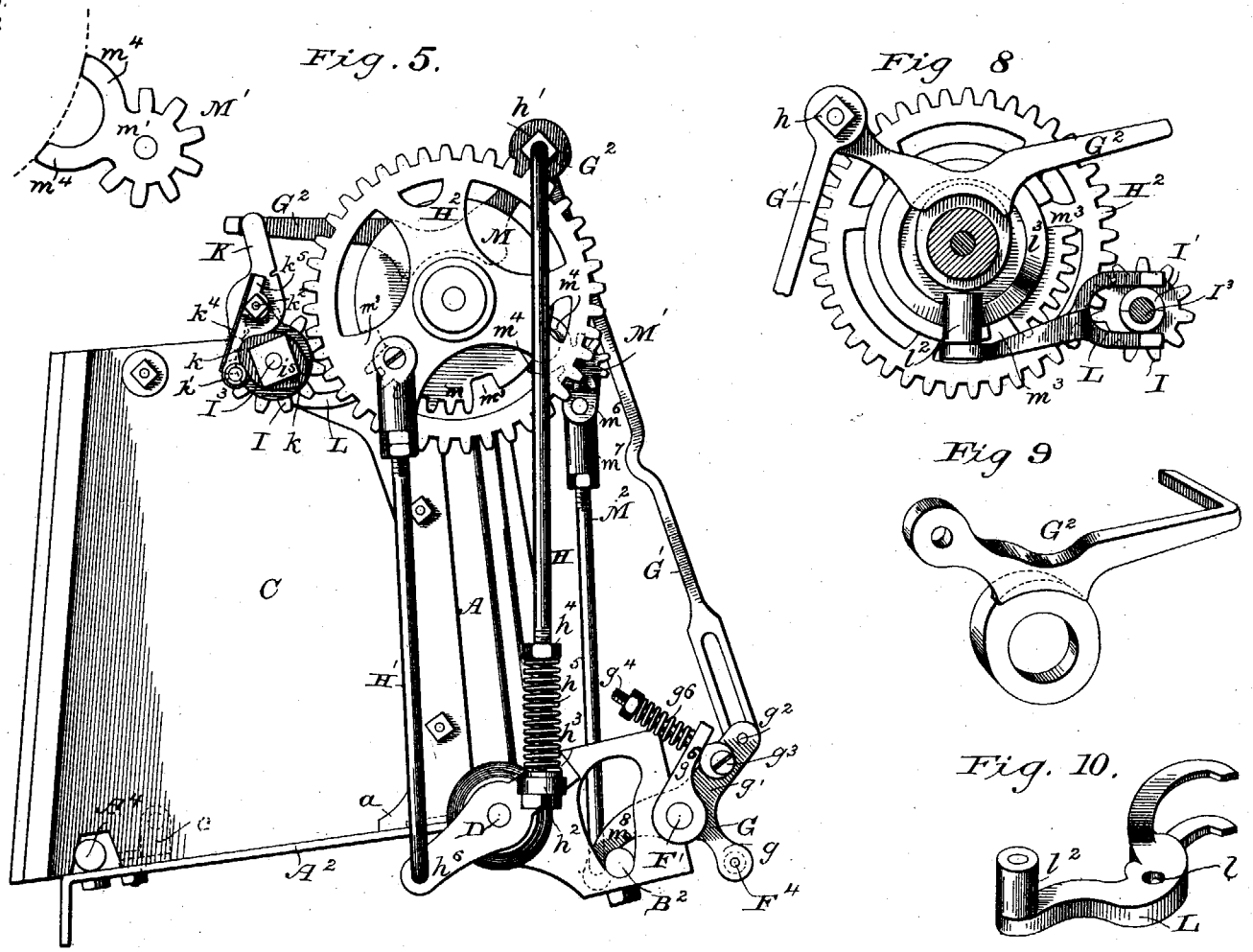
Figure 6:
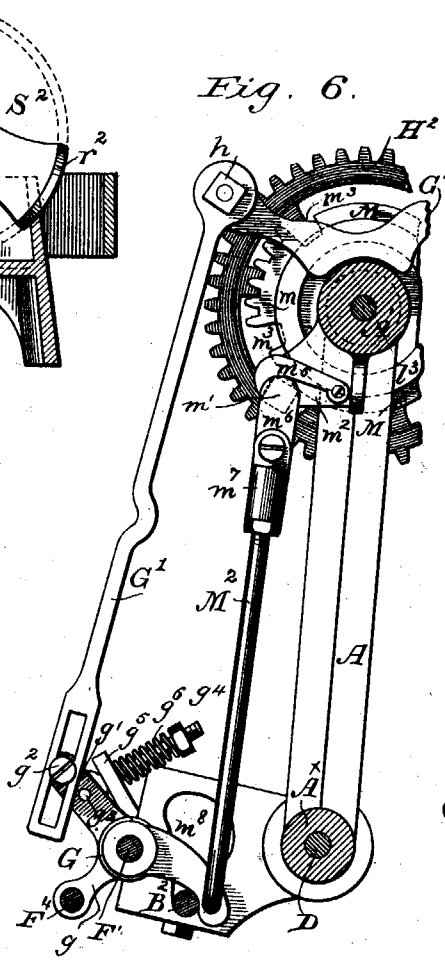
Figure 24:
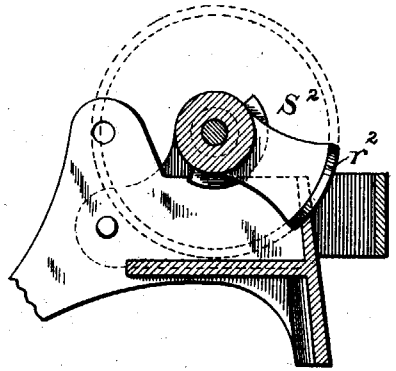
Figure 7:
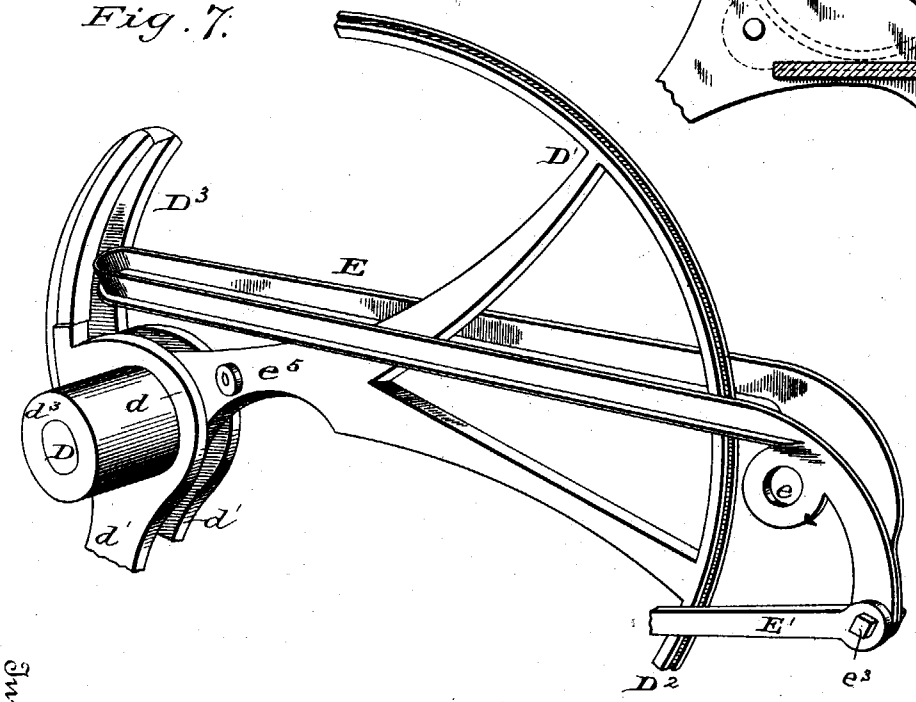

In the drawings, Figure 1 is a top plan view of a grain-binder embodying my invening; Fig. 2, an elevation thereof from the stubble side; Fig. 3, an elevation from the inner or grain side; Fig. 4, a front end elevation, the grain table or decking being in section; Fig. 5, a rear elevation; Fig. 6, an elevation in section on the correspondingly-numbered line in Fig. 2, partly broken away and seen from the front; Fig. 7, a perspective detail view embracing a portion of the outside tripping and compressing finger, the binder arm or needle, and the table-trip in their relative positions, and the latter represented in full; Fig. 8, a section on the correspondingly-numbered line in Fig. 1, looking from the front; Fig. 9, a perspective view of the trip-latch for throwing the main driving-pinion into and out of effective gear with the tyer-shaft; Fig. 10, a perspective view of the clutch-shipper which throws the packer-shaft out of connection with the main driving-pinion during the operation of encircling and tying the accumulated gavel; Fig. 11, a longitudinal sectional detail of a portion of the overhanging arm of the main bracket or post-frame inclosing the tyer-shaft and showing the relative positions of the gear by which it is driven, the segment toothed disk and face-cam on said gear, the trip-latch, and packer-clutch shipper; Fig. 12, an enlarged sectional detail on the correspondingly-numbered line in Fig. 1 in explanation of the mechanism for operating the ejectors; Fig. 13, also an enlarged sectional detail on the line indicated by like numerals in Fig. 4; Fig. 13[a], a cross-section of Fig. 13; Fig. 14, an enlarged detail, in perspective, of the trip-clutch and immediately-accessory mechanism for throwing the packers and binding mechanism into and out of action, and Fig. 15 a longitudinal central sectional view thereof; Fig. 16, a vertical section through the knotting-head, taken on the line 16 16 of Fig. 1 and seen from the front; Fig. 17, a bottom plan view of the knotter-frame; Fig. 18, a second section through the knotter-head on the line 18 18 of Fig. 1, the holder-frame being omitted; Fig. 19, a perspective view of the tubular knotter-spindle carrying the upper knotting-jaw; Fig. 20, a like perspective view of the stem inclosed by said spindle and carrying the second knotting-jaw and deflecting ears or guards; Fig. 21, a perspective view of the loop-stripper and its shaft; Fig. 22, an enlarged perspective view of the swinging holder-frame, showing the holder-jaws and cutter in their relative positions; Fig. 23, a sectional detail on the line indicated in Fig. 2 by like numerals; and Fig. 24, a detail of the tyer-shaft and part of the knotter-frame, with the cam-arm which opens the positive jaw of the cord-holder.

A represents the post-frame or main bracket of a binding attachment for a harvester, formed, as usual nowadays, in a single casting, with tubular overhanging arm A′, in which the tyer-shaft takes bearing, and corresponding subtending arm A[×], which incloses the needle-shaft. Bolted to ears or projections *a a′* from this subtending arm are transverse metal frame bars or girts A[2] and A[3], the former at the rear of the arm and the latter adjacent to its front end, and to the inner or grain ends of these girts is firmly secured a longitudinal rod or frame bar A[4], corresponding in length to the length of the binder attachment and serving as the means of connection between binder and harvester frame. Eyebolts *b*, embracing this longitudinal rod, secure pivotally thereto the inner ends of timbers B, carrying the binder-deck or grain-table B′, the under side of which latter toward the delivery edge is provided with a toothed rack *b′*, that is engaged by a pawl *b*[2], sleeved upon an outer longitudinal frame bar or rod B[2], supported from the harvester and secured to the subtending arm of the post-frame, so that by adjusting this pawl along the rack and securing it against accidental displacement by means of the set-screw $b^3$, passing through its hub and binding against the supporting rod or pivot, the inclination of the binding-table may be altered, as deemed expedient. A wind-board, end plate, or guard C is bolted to a web from the post of the main bracket and extends thence inwardly along and above the rear metal frame-bar and at its extreme inner lower end or corner is steadied and braced by a strap or angle-iron $c$, secured to said bar.

D is the needle-shaft journaled, as already stated, in the subtending arm of the main bracket and carrying at its front end beyond said arm and secured in any suitable manner the needle or binder arm D′, which has the customary concentric guard $D^2$, to cut off incoming grain and make a clean separation as the needle rises, and is provided, as usual, with a groove along its back for the reception of the cord, and with an eye near its point, through which said cord runs. To that end of the needle-shaft which projects beyond the subtending arm of the post-frame is loosely sleeved the outside tripping and compressing finger $D^3$, having a bifurcated hub $d$ and downwardly-projecting arms or heel-extensions $d'$ therefrom, that lie on either side of and embrace the hub of the needle, which latter, being keyed to the shaft, serves to hold the trip-finger in a fixed position and prevent its having any lateral movement on the shaft. Between the ends of these arms or heel-extensions is pivoted upon a pin $d^2$, uniting them, one end of the link $D^4$, the other end being slotted and connected to a crank-arm $D^5$, hereinafter referred to.

Between the needle-shaft and the hub of the trip-finger are interposed collars $d^3$, which are flush with the hub of the needle. Said collars are keyed to the shaft and form bearings for the trip-finger, which is free to oscillate thereon. One of the downwardly-projecting arms or heel-extensions of said trip-finger is provided with a lateral stud $d^4$, which projects into a slot $d^5$ in a hanger $d^6$ from the subtending arm of the main bracket, thereby positively limiting the movement of the finger about its supporting-shaft.

The table-trip E is made of a single strip of metal folded upon itself, forming parallel arms, which are united at their outer ends and near their inner ends are provided with bearings $e$, which embrace the inner longitudinal frame-bar. At each side of the bearings a collar $e'$ is arranged upon the frame-rod, one being fixed and the other adjustable by set-screw $e^2$, such arrangement permitting the ready removal of the table-trip from the rod, and also affording a means for taking up wear. Beyond the bearings the arms are bent or curved downward to bring their leverage below the fulcrum, and are united by a bolt $e^3$ to one end of a link E′, the other end of which is longitudinally slotted, as at $e^4$, and takes over the pin $d^2$, that connects the heel-extensions of the outside trip-finger, thus permitting to both the table-trip and the trip-finger a movement in one direction without necessarily affecting the position of the other, but insuring that the depression of the outer end of the table-trip shall rock the outside trip-finger in the same direction in which it would be rocked by the pressure of the grain against it to cause its effective action. The arms of the table-trip are disposed one upon each side of the binder-arm, the extreme outer end of said table-trip moving just inside of the trip-finger and in a plane that when prolonged passes through said finger. In its normal position its outer end is raised somewhat above the level of the decking with the intermediate link pressing or pulling against the heel of the trip-finger, so that as the grain acmulates and is packed against the two it may either rock the trip-finger outward by direct pushing thereon or else press the table-trip downward, and thereby draw upon the link and impart to the trip-finger the same outward movement, or else by concurrently pushing upon one and pressing upon the other actuate the tripping mechanism through both at once.

Upon the shank of the binder-arm are laterally-projecting studs carrying anti-friction rollers $e^5$, arranged beneath the arms of the table-trip, but at a sufficient distance therefrom in the position of rest to permit it to yield for the purpose of tripping the binder. These roller-bearing studs strike the forward end of the table-trip in the upward movement of the binding-arm and lift it against the gavel to compress the latter from beneath against the overlying breast-plate.

F are the "kickers" or bundle-ejectors, each of which consists of a curved arm with one end firmly secured to a shaft F′, while at its outer end it is provided with a backwardly-projecting curved guard $F^2$, movement of the same through the decking being provided for by slots made therein. The action of the ejectors will be explained farther on. The crank-arm $D^5$, above referred to, is sleeved upon the ejector-shaft, which is hung in bearings $F^3$, formed in projections or ears on the subtending arm of the main bracket. This crank-arm has keyed to it at a point midway between its ends one end of a rod $F^4$, while the opposite end of said rod is secured to one arm $g$ of a bell-crank lever G, having its fulcrum coincident with the ejector shaft. The other arm $g'$ of the bell-crank lever is connected by a crank-pin $g^2$ with a slotted bent connecting-rod G′, hereinafter called the "trip-rod," said pin passing through and sliding in the slot of the rod, while the upper or opposite end of said rod is connected with a trip-latch $G^2$, which is sleeved upon a hub on the upper tubular arm of the main bracket that, as already stated, incloses the tyer-shaft. The upper arm of the bell-crank is also provided with a headed pin or projection $g^3$, which passes through the eye of and is thus connected to a short pintle $g^4$, playing loosely through a crank-arm $g^5$ on the end of the ejector-shaft and encircled by a spring $g^6$, confined upon said pintle by a nut and bearing against said nut and crank-arm, the purpose of which connection is to permit the outside trip-finger to yield to the pressure of the grain in resisting and forming the bundle without imparting any movement to the ejector-shaft, said connection serving also as a means to return the trip-finger to its normal position after the operation of the ejectors and during the time when the latter are returning to their first position.

The nose of the trip-latch is hooked, in order to catch the trip-dog, and through its heel end, to which the trip-rod is connected, as just explained, passes the upper bent end of a rod H, that restores the latch to its normal position, and therefore may be termed the "resetting-rod," said bent end being secured by nuts $h$ $h'$ and serving as the pivot between the latch and trip-rod. The lower end of the resetting-rod plays through a swiveled eyebolt $h^2$ from an arm $h^3$, rigid with the needle-shaft, and between this bolt and a nut $h^4$ on the rod is seated a coiled spring $h^5$, whereby the rod is permitted to yield before the latch when the latter is positively moved to start the binding devices. When these are once started, the arm $h^3$, with its eyebolt, is carried down by the rocking of the needle-shaft as the binder-arm moves to encircle the gavel, and the rod is thereby held in its depressed position, consequently holding the trip-latch with its terminal hook out of the path of the trip-dog until the band is tied and the binder-arm again recedes.

A crank-arm $h^6$ on the end of the needle-shaft is connected by a pitman H′ with a wrist-pin upon the main gear $H^2$, keyed upon the tyer-shaft. This gear-wheel meshes into a small pinion I, hereinafter styled the "driving-pinion," journaled on the cylindrical inner end of a clutch-sleeve I′, which latter bears upon its outer squared end $i$ the sliding hub $i'$ of a chain or sprocket wheel $I^2$, receiving motion from the harvester to operate the entire binder. This sleeve loosely embraces a shaft $I^3$, supported in bearings $i^2$ $i^3$, formed in lugs projecting from the inner side of the overhanging arm of the main bracket and serving as the packer-shaft. The inner abutting end of the sleeve is formed with a clutch-face, and it is moved automatically into engagement with an opposing clutch-sleeve $I^4$, pinned to the packer-shaft by means of a coiled spring $i^4$, disposed between its outer end and a nut $i^5$ at the extreme rear end of said shaft.

The sliding sleeve, which, as just intimated, is driven by the chain-wheel, also carries two studs or projections $k$, which at different times are engaged by an anti-friction roller $k'$ on the trip-dog K, which is pivoted upon a lateral pin $k^2$ from a radial arm $k^3$ of the driving-pinion, and the heel of which is arranged to be caught by the terminal hook of the trip-latch, said roller being urged into engagement with one of the studs whenever the dog is released from the latch by means of a spring $k^4$, fastened at one end to an arm $k^5$, secured to the pivot-pin of said dog. During the engagement of either of said studs with the roller on the trip-dog, which follows the actuation of the tripping devices, the driving-pinion I partakes of the rotation of the constantly-driven sleeve I′, upon which it is mounted, and of course imparts motion to the main-gear and tyer and needle shafts and the mechanism which they control. One revolution of the main gear suffices to effect the functions of all the binding devices, and in the latter half of this revolution as the binder-arm recedes the hooked end of the trip-latch is gradually carried down into the path of the trip-dog by the action of the resetting-rod extending between its other end and the eyebolt that rocks with the needle-shaft, and just at the completion of said revolution and the attendent binding operations the hook will catch and stop the heel of the trip-dog, thus swinging it on its pivot and throwing its roller out of engagement with and out of the path of the studs on the sliding sleeve, thus disconnecting the driving-pinion from said sleeve and bringing it to rest until the tripping devices are again actuated.

While the needle and tying devices are operating the sliding sleeve is held out of engagement with the clutch-sleeve upon the packer-shaft, so that the latter and the packing-fingers operated by it may remain idle; but at the moment that the separation takes place between the driving-pinion and the sliding sleeve the sleeve is left free to be carried into immediate engagement with the clutch by the force of its spring, thereby again starting the packer-shaft to gather another gavel into the binding-throat. This is accomplished by means of a forked shipper L, pivoted at $l$ to a lug $l'$ from the head of the main bracket, the actuating-arm of said shipper having a roller $l^2$, which travels upon an annular cam-flange $l^3$ on the inner face of the main gear, while its other forked arm embraces the fixed clutch-sleeve on the packer-shaft and is carried by the action of said cam-flange against the inner face of the driving-pinion at the very outset of the revolution of the main gear, and through pressure upon said pinion forces the sliding sleeve away from the fixed sleeve and holds it out of engagement therewith until the conclusion of the binding operation, when the cam-flange falls away, releasing the pressure upon the driving-pinion and sliding sleeve and allowing the latter to move into re-engagement with the clutch-sleeve at the moment the ejection of the bound sheaf takes place, as will be noted farther on. The main gear has also upon its inner side a disk M, provided with a toothed segment $m$. The teeth of said segment gear at the proper time with a small pinion M′, fast to a short shaft $m'$, taking bearing in an offset $m^2$ from the outer lower side of the overhung arm of the main bracket. The disk has at each end of its toothed segment a notch or recess $m^3$, into one of which enters one of the two horns $m^4$ of the pinion as the latter begins to gear with said segment, while the other enters the farther notch upon the escape of the pinion from said segment, as customary in stop-motions, to insure accurate action. After such escape of the pinion the said horns come in contact with the plane surface or periphery of said disk during the further revolution of the main gear, holding the pinion motionless. A dog or hook $m^5$, pivoted to a projection on the main bracket, fits or rests upon a squared surface of the shaft $m'$, to more effectively enable the horns to hold the pinion against movement when at rest.

To the crank-arm $m^6$ on the shaft $m'$ is pivoted by a pin and a screw-threaded sleeve $m^7$, together with a jam-nut, one end of a link $M^2$, which connects by a curved crank-arm $m^8$ with the ejector-shaft, whereby said shaft will be so actuated as to cause the ejectors to move up and outward through the slotted decking or grain-table, so as to "kick" or throw the bundle off the platform after having been formed and bound and to recede beneath the table after such operation, the pinion M′, the primary moving-power of said ejectors, being so adjusted or timed with relation to the toothed segment of the actuating-disk as to cause the ejectors to move toward and to act upon the sheaf when the binder-arm moves away therefrom. Until the moment when the ejectors start toward the sheaf and the binder-arm begins to move away therefrom the outside tripping and compressing finger has been held up against said sheaf opposing the binder-arm by means of its elastically-yielding connection with the crank-arm on the end of the ejector-shaft; but when the ejectors start forward and the binder-arm begins to recede the tripping and compressing finger moves outward before the ejector, or, in other words, is rocked outwardly upon its pivot by the action of the crank-arm on the ejector-shaft, so as to fall beneath the plane of the table and allow the sheaf to escape unobstructed, and as the ejectors are retracted the compressor is returned concurrently to its normal position.

N N′ are the packing-fingers or "packers," which are pointed slightly-curved bars hung about centrally of their lengths upon oppositely-projecting cranks on the packer-shaft, whereby they are given an alternate action in accumulating and packing the grain into the binding-throat as it is received from the harvester preparatory to binding the sheaf. The upper ends or shanks of the packers are longitudinally slotted, as at $n$, and receive guide-pins $n'$ from the arms of a T-bracket $N^2$, the base of which forms the cap of the box that supports the inner end of the packer-shaft, the effect being that the cranks in their revolution impart an orbital movement to the point of each respective packer.

The tyer-frame O is bolted to offsets $o$ $o'$ from the forward end of the overhung arm of the post-frame, the inner offset $o$ being the same which at that end affords the pillow-block for the bearing of the packer-shaft. The base of the T-bracket, besides serving as a cap to this pillow-block, is secured to said tyer-frame and has bolted or fastened to its upper side the inner end of the breast-plate O′, curving outwardly after being so attached and bent about midway of its length from the curve, as at $o^2$, where it is secured to the inner legs of said frame, and thence extending to the outer legs, where it is again secured. Upon the upper side of the inner end of this breast-plate is bolted a cross-bar $O^2$, having forwardly-projecting pendent flexible arms or stiff wires $o^3$, against which the grain primarily accumulates and from which the packers carry it onward wisp by wisp. The binding-table is provided at its inner side and in precedence of these wires with inclined notched ledges $o^4$—one on each side of the slot—through which the binder-arm passes, to resist the pushing back of the grain as the packers alternately withdraw from operation. In or about the middle of the breast-plate and opposite the slot in the binding-table is formed the cord-slot, above the rear edge of which is disposed and secured to said plate a flat spring $o^5$, which, as the binder-arm passes through said slot, cleans the eye portion of said arm and the end of the cord which it carries of any foreign substances or grain that may have adhered thereto.

The knotter consists of a spindle P, provided at its lower end with a slightly-upward-curved radial jaw $p$, the upper end of said spindle passing through the top plate of the tyer-frame and bearing in a support or casting thereon. Said spindle is hollow, and through it passes a stem or rod P′, having at its foot a lateral arm $p'$, which serves, in conjunction with the jaw upon the spindle, as a lower jaw to grasp the crossed ends of the band in the tying operation. Two other arms $p^2$ from this stem curve upward and act as guards to prevent the cord wrapping around the spindle while the knot is being formed. To open the lower jaw away from the upper, in order to receive the cord-strands between the two, the tyer-shaft, which extends directly over and slightly above the knotter, has a cam $P^2$, arranged to act upon an adjustable head or shoulder $p^3$ at the upper end of the stem, and an expanding spring $p^4$, coiled about said stem and seated at one end against the head and at the other against the spindle, effects the closing of the jaws the instant the cam passes off. The tyer-shaft also carries a gear and cam wheel $P^3$, that may be termed the "tyer-cam," having a gear-segment $p^5$ and the usual delay-ledge, the teeth of which segment mesh with and drive a bevel-pinion $p^6$ upon the knotter-spindle once in each revolution of the tyer-shaft, thereby rotating the knotter to loop the cord and lay the knot. The heel of the upper knotting-jaw projects slightly beyond the spindle and is vertically slotted, as at $p^7$, to receive a steady pin or dowel $p^8$ from the heel of the lower, whereby said lower jaw will be held in alignment with and partake of the rotation of the upper imparted by the spindle, but will be permitted to open away therefrom or close theretoward as induced by the action of the cam or spring upon its stem for the purpose of grasping the knot ends.

Q is the stripping-finger or loop-stripper connected to a shaft Q′, extending through a sleeve or box $q$, fastened to the top plate of and depending therefrom within the tyer-frame contiguously to the knotter-spindle. At or about the upper end of this shaft is a spring $q'$, and above the latter said shaft is provided with a tappet-wheel $Q^2$, against which the spring expands, thereby permitting the stripper to accommodate itself to the rising and falling movement of the lower jaw of the knotter and holding it in contact with said jaw during the operation of forming the knot. The teeth of the tappet-wheel are engaged by a solitary tooth $q^2$ on the tyer-cam just after the knotter has been rotated by the gear-segment on said cam, thereby vibrating the stripping-finger and causing it to push the loop off of the knotting-jaws, and immediately following the action of said tooth $q^2$ an arm $q^3$, carried by the tyer-shaft on the opposite side of the tappet-wheel from the tyer-cam, will strike and reverse said wheel to return the stripping-finger to its position of rest in readiness for the removal of the loop next formed.

In order to prevent the interference of the tyer-cam with the stripper-pinion after the latter has escaped from the first or actuating-tappet and to allow it to be reversed by the second or replacing tappet, the body of the tyer-cam is cut away, as at $q^4$, upon one side of the tappet $q^2$, while upon the other side thereof the body is again cut away to produce an aperture $q^5$, into which a tooth of said pinion enters just previous to the engagement of its next tooth with said tappet to impart the requisite stroke to the stripping-finger and insure certainty of action of said parts.

The cord-holder is composed of two jaws, the first of which R is the positive jaw, and is formed as a hooked lever pivoted near its upper portion to a swinging holder-frame R′ and having beyond the pivot a heel projection, which carries an anti-friction roller $r$, normally traveling upon an annular flange or rim $r'$ on the tyer-cam, to hold said jaw positively against the other, but at the proper moment temporarily deflected by means of a cam-arm $r^2$ from the tyer-shaft into a recess $r^3$ in said rim, the effect of which is to open or retract the jaw. The positive jaw is slotted at its lower end to receive the end of a co-operating serrated jaw $R^2$, pivoted at its upper end to the same frame and held in contact with the first by a spring $r^4$ and prevented by means of a stop $r^5$ when its mate is withdrawn from following beyond a limited distance. A knife or cutter $R^3$ is adjustably secured to the holder-frame, as shown in Fig. 23, at the right-hand side of the needle-opening therein and near the bottom edge of said frame directly in rear of the clamping-edges of the two holder-jaws.

The holder-frame is hinged to or connected with the upper and outer corners of the knotter-frame by means of pivot-pins $s$ $s'$, the latter of which, being rigid with said holder-frame, has an arm S, extending down outside of the knotter-frame and bearing against a spring $s^2$, which itself is seated upon a stud $s^3$, projecting from the side of said last-named frame, and acts to carry the holder outward against the stress of the binding-cord. From the upper end of one side bar of the holder-frame extends inwardly a fixed arm S′, that engages with a wiper $S^2$ on the tyer-shaft, the purpose of which is to cause the inward movement of the frame, in order to allow the cord held by the holder connected to said plate, as above stated, to readily yield slack to the looping action of the knotter. As soon as the cam passes off of said arm, the just-mentioned spring returns the frame to its normal or original position. A second fixed arm $S^3$ extends inwardly from the holder-frame below the tyer-shaft and from the opposite side of said frame, and is acted upon by a wiper $S^4$ upon said tyer-shaft, so as to hold the plate firmly or immovably when at the maximum limit of its outward movement.

In operation, when the binder-arm puts the cord around the bundle of grain the knotter makes a revolution, looping the cord around and receiving the ends between the jaws, which retain the cord by the action of the parts before described. At this juncture the cam-actuated holder-jaw releases the cord previously left by the binder-arm and grasps the end of the new cord and forces it in contact with the knife, thus severing it. The stripper now acts, and a knot is formed in the cord. The ejectors arrive immediately thereafter at their maximum limit of movement, discharging the bundle of grain from the platform.

I claim—

1. The combination, substantially as hereinbefore set forth, of the binder-arm, the shaft to which it is keyed, the tripping-lever having a bifurcated hub mounted upon said shaft and embracing the hub of the binder-arm, the lateral pin from a heel-extension of said lever taking into a slotted hanger from the bearing of said shaft to limit the play of the finger, and connections between said heel-extension and the trip-latch.

2. In a grain-binder, the combination, substantially as hereinbefore set forth, of the tyer-shaft, the main gear keyed to its outer end, the needle-shaft, the crank and pitman connecting the latter shaft with the main gear, the packer-shaft, a two-part clutch mounted thereon, one part fixedly, the other loosely and continuously rotated, a pinion journaled on the movable part of the clutch so as to slide thereon and meshing with the main gear, a trip-dog pivoted on a stud projecting from the side of the pinion, a spring attached to said stud and bearing on the dog, and lugs projecting from the sliding clutch-sleeve within the path of the dog.

3. In a grain-binder, the needle and its shaft connected to the tyer-shaft, the latter being intermittently operated from the packer-shaft, in combination with the trip-latch sleeved on the hub of the tubular overhung arm of the main bracket inclosing the tyer-shaft, its nose being adapted to disengage the clutch between the packer-shaft and the tyer-shaft, the trip and resetting rods attached directly to the heel of the trip-latch, and the lower end of the resetting-rod being yieldingly connected to a crank on the needle-shaft to permit the independent movement of said rod when the trip-latch is thrown out of the normal or operative position to allow the engagement of the packer and tyer shafts, and the lower end of the trip-rod being slotted and connected to a crank on the ejector-shaft by a pin passed through said slot to permit the operation of the ejectors before the trip-latch is returned to a normal position.

4. In a grain-binder, the combination, substantially as hereinbefore set forth, of the needle and its shaft, the tyer-shaft, the main gear keyed thereto, the packer-shaft, a clutch consisting of a fixed part and a sliding part or sleeve, a driving-pinion journaled on the sliding part of the clutch and meshing with the main gear, the clutch-shipper having one end bearing on the pinion and the other on a cam-flange projecting laterally from the main gear, a trip-dog and lug to lock the pinion to the sliding part of the clutch, a trip-latch to disconnect the dog from the lug, trip and resetting rods connected directly to said lever and to crank-arms of the needle and ejector-shafts, respectively, and a pitman connecting the main gear with a crank of the needle-shaft.

5. In a grain-binder, the combination of the tyer-shaft, a main gear keyed thereto and having a cam-faced annular flange projecting laterally from its side, the packer-shaft, a two-part clutch mounted thereon, one part fixedly, the other loosely, to have a longitudinal movement on the packer-shaft, a spring tending to force said sliding part into engagement, a driving-pinion journaled on the sliding-clutch half adapted to be intermittently locked thereto and meshing with the main gear, and the shipper pivoted midway between its ends to vibrate horizontally, one of its ends carrying a roller to bear against the face of the annular cam-flange on the main gear, the other end of said lever being forked and having its arms extending one on either side of the clutch and resting upon the side of the driving-pinion, as and for the purposes described.

6. The combination, substantially as hereinbefore set forth, with the tyer-shaft having cams $S^2$ and $S^4$ and the knotter-frame, of a holder-frame carrying the cord holding and cutting devices pivotally connected to the upper outer corners of the knotter-frame by pivot-pins, an arm extending downward outside of the knotter-frame from one of said pivot-pins, a spring interposed between the end of said arm and a stud on said frame, and arms $S'$ and $S^3$, projecting inwardly from the upper ends of the holder-frame and adapted to bear upon the aforesaid cams, respectively.

7. In a grain-binder, the binding table or deck pivoted at its inner side to the harvester-frame and having a rack on its under side, in combination with an adjustable supporting-arm pivoted to the harvester-frame beneath said table, substantially as and for the purposes set forth.

8. In a grain-binder, the combination of the tyer-shaft having wipers $S^2$ $S^4$ and cam-arm $r^2$, the tyer-cam having an annular flange recessed opposite said cam-arm, the knotter-frame, the knotter mechanism, a holder-frame pivoted to the knotter-frame and having inwardly-projecting arms to engage the wipers, a cord-holding jaw pivoted to the plate and having an extension to project against said annular flange, a co-operating serrated jaw, a spring urging said serrated jaw toward the other, and the knife $R^3$, all arranged and operating substantially as described.

9. In a knotting-head for grain-binders, the combination, substantially as herein set forth, of the knotter composed of the tubular spindle and inclosed stem, knotting-jaws projecting from said spindle and stem and guard-arms on the stem, the heel of the spindle-jaw having a notch in which a steady-pin from the stem plays, a spring giving the stem an upward thrust to close the jaws, a cam on the tyer-shaft to open the jaws, a pinion on the knotter-spindle, a vibrating loop-stripper, and a spring exerting an upward pressure on the stripper-shaft, a tappet-wheel keyed to the upper end of said shaft, a segment $p^5$ and a solitary tooth $q^2$ on the tyer-cam to actuate the knotter-spindle and stripper-shaft, respectively, at successive intervals of time, and a tappet-arm from the tyer-shaft on the side of the stripper-shaft opposite the tyer-cam to return the stripper to its normal position.

PETER PAUL COLER.

Witnesses:
JOHN WENKER,
W. D. STACY.